(12) United States Patent
Inoue et al.

(10) Patent No.: US 9,639,514 B2
(45) Date of Patent: May 2, 2017

(54) INFORMATION BROWSING APPARATUS AND RECORDING MEDIUM FOR COMPUTER TO READ, STORING COMPUTER PROGRAM

(71) Applicants: Masayuki Inoue, Hachioji (JP); Tetsuhiro Shibata, Sagamihara (JP); Keiichiro Hyodo, Kokubunji (JP)

(72) Inventors: Masayuki Inoue, Hachioji (JP); Tetsuhiro Shibata, Sagamihara (JP); Keiichiro Hyodo, Kokubunji (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 418 days.

(21) Appl. No.: 13/686,114

(22) Filed: Nov. 27, 2012

(65) Prior Publication Data
US 2013/0139045 A1 May 30, 2013

(30) Foreign Application Priority Data
Nov. 28, 2011 (JP) ................. 2011-259438

(51) Int. Cl.
*G06F 17/24* (2006.01)
*G06K 9/20* (2006.01)
*G06F 3/0488* (2013.01)

(52) U.S. Cl.
CPC ......... *G06F 17/243* (2013.01); *G06K 9/2081* (2013.01); *G06F 3/04883* (2013.01); *G06F 17/241* (2013.01); *G06K 2209/01* (2013.01)

(58) Field of Classification Search
CPC ........ G06F 17/21; G06F 17/24; G06F 17/241; G06F 17/242; G06F 17/243; G06F 17/30; G06F 17/30896

(Continued)

(56) References Cited

U.S. PATENT DOCUMENTS 5,146,552 A * 9/1992 Cassorla ................ G06Q 10/10
715/200
5,402,504 A * 3/1995 Bloomberg et al. .......... 382/175
(Continued)

FOREIGN PATENT DOCUMENTS

JP 9-305299 A 11/1997
JP 2008-084137 A 4/2008
(Continued)

OTHER PUBLICATIONS

Bott et al.; Special Edition Using Microsoft Office Home and Student 2007; 2008; Que Publishing; pp. 161-170 and 711-720.*
(Continued)

*Primary Examiner* — Andrew Dyer
(74) *Attorney, Agent, or Firm* — Buchanan Ingersoll & Rooney PC

(57) ABSTRACT

Provided is an information browsing apparatus provided with a display section on which display surface a touch panel to detect contact of an object is disposed. The information browsing apparatus is capable of displaying a document in a first display form where the entire display section is configured with a single region, and in a second display form where the display section is divided into a plurality of regions and provided with a data processing section. In case handwriting information is inputted straddling two or more than two regions in the second display form, the data processing section judges to which region the handwritten information belongs, thereafter when the display from is changed to the first display form, the data display section displays all of the handwritten information in the region which is judged that the hand written information belongs to the region thereof.

12 Claims, 12 Drawing Sheets

(58) Field of Classification Search
USPC .......................... 715/224, 230, 255, 256, 26
See application file for complete search history.

(56) References Cited

U.S. PATENT DOCUMENTS

| | | | | |
|---|---|---|---|---|
| 5,454,046 | A * | 9/1995 | Carman, II | G06K 9/68 382/186 |
| 5,583,542 | A * | 12/1996 | Capps | G06F 3/04842 345/173 |
| 5,594,810 | A * | 1/1997 | Gourdol | G06F 3/04883 382/186 |
| 5,613,019 | A * | 3/1997 | Altman | G06F 3/04883 382/189 |
| 5,796,866 | A * | 8/1998 | Sakurai | G06K 9/00409 382/187 |
| 5,821,925 | A * | 10/1998 | Carey | G06T 19/00 345/419 |
| 5,889,523 | A * | 3/1999 | Wilcox | G06F 3/04842 715/205 |
| 6,011,865 | A * | 1/2000 | Fujisaki | G06K 9/6293 382/189 |
| 6,088,481 | A * | 7/2000 | Okamoto | G06F 3/0488 345/179 |
| 6,108,444 | A * | 8/2000 | Syeda-Mahmood | G06K 9/00859 382/170 |
| 6,279,014 | B1 * | 8/2001 | Schilit et al. | 715/234 |
| 6,331,867 | B1 * | 12/2001 | Eberhard | G06F 1/1626 715/824 |
| 6,356,287 | B1 * | 3/2002 | Ruberry | G06F 1/1626 715/863 |
| 6,486,895 | B1 * | 11/2002 | Robertson | G06F 3/0483 707/E17.111 |
| 6,687,876 | B1 * | 2/2004 | Schilit et al. | 715/231 |
| 7,010,165 | B2 * | 3/2006 | Hullender | G06K 9/3283 382/186 |
| 7,062,090 | B2 * | 6/2006 | Simmons | G06F 17/242 382/186 |
| 7,234,108 | B1 * | 6/2007 | Madan | 715/223 |
| 7,259,752 | B1 * | 8/2007 | Simmons | G06F 3/04817 345/173 |
| 7,321,692 | B2 * | 1/2008 | Bryborn | B29C 45/14 382/202 |
| 7,751,623 | B1 * | 7/2010 | Simmons | G06F 17/242 345/173 |
| 7,962,846 | B2 * | 6/2011 | Lerner et al. | 715/230 |
| 8,438,477 | B2 * | 5/2013 | Hara | G06T 3/0012 715/243 |
| 8,553,015 | B2 * | 10/2013 | Kazamaki | G06F 17/241 345/179 |
| 2001/0043716 | A1 * | 11/2001 | Price | G06F 3/0488 382/100 |
| 2002/0049787 | A1 * | 4/2002 | Keely | G06F 17/211 715/205 |
| 2002/0067854 | A1 * | 6/2002 | Reintjes | G06F 3/0488 382/199 |
| 2003/0179201 | A1 * | 9/2003 | Thacker | G06F 3/0481 345/441 |
| 2003/0214553 | A1 * | 11/2003 | Dodge | 347/41 |
| 2003/0226113 | A1 * | 12/2003 | Altman et al. | 715/520 |
| 2004/0143796 | A1 * | 7/2004 | Lerner | G06F 3/04883 715/234 |
| 2004/0161150 | A1 * | 8/2004 | Cukierman et al. | 382/186 |
| 2004/0252888 | A1 * | 12/2004 | Bargeron et al. | 382/188 |
| 2005/0041834 | A1 * | 2/2005 | Wakeam et al. | 382/100 |
| 2005/0125717 | A1 * | 6/2005 | Segal | G06F 17/242 715/201 |
| 2005/0177783 | A1 * | 8/2005 | Agrawala et al. | 715/512 |
| 2005/0289453 | A1 * | 12/2005 | Segal | G06F 1/12 715/203 |
| 2006/0031764 | A1 * | 2/2006 | Keyser et al. | 715/525 |
| 2006/0050969 | A1 * | 3/2006 | Shilman et al. | 382/224 |
| 2008/0082910 | A1 * | 4/2008 | Nishino | G06F 17/2264 715/231 |
| 2008/0195931 | A1 * | 8/2008 | Raghupathy et al. | 715/230 |
| 2008/0260241 | A1 * | 10/2008 | Ye | G06K 9/00409 382/159 |
| 2009/0019347 | A1 * | 1/2009 | Noguchi | H04N 1/00082 715/200 |
| 2009/0307618 | A1 * | 12/2009 | Lawler | G06F 3/0481 715/764 |
| 2010/0149206 | A1 * | 6/2010 | Shigehisa | G06F 3/04883 345/595 |
| 2010/0174984 | A1 * | 7/2010 | Kobashi | G06F 17/24 715/243 |
| 2011/0040644 | A1 * | 2/2011 | Juda | G06F 17/21 705/26.3 |
| 2013/0054636 | A1 * | 2/2013 | Tang | 707/769 |

FOREIGN PATENT DOCUMENTS

| | | | |
|---|---|---|---|
| JP | 2009-199621 A | 9/2009 | |
| WO | WO0175781 A1 * | 10/2001 | G06K 11/18 |

OTHER PUBLICATIONS

Daniel Escapa; OneNote Side-by-Side; Apr. 7, 2008; MSDN Blogs; pp. 1-4.*
Office Action (First Notice of the Opinion on Examination) issued on Apr. 22, 2015, by the State Intellectual Property Office of People's Republic of China in corresponding Chinese Patent Application No. 201210480389.5, and an English translation of the Office Action. (11 pages).
Second Notice of the Opinion on Examination dated Dec. 28, 2015 issued in the corresponding Chinese Patent Application No. 201210480389.5 and English translation (23 pages).
Office Action (Third Notice of the Opinion on Examination) issued on Jul. 7, 2016, by the State Intellectual Property Office of the People's Republic of China in corresponding Chinese Patent Application No. 201210480389.5 and English translation of the Office Action. (23 pages).
Decision of Rejection issued in corresponding Chinese Patent Application No. 201210480389.5, dated Dec. 2, 2016, with English Translation (20 pages).

* cited by examiner

100: INFORMATION BROWSING APPARATUS

DISPLAY SECTION, OPERATION SECTION, ELECTRONIC PAPER + TOUCH PANEL

100: INFORMATION BROWSING APPARATUS

HANDWRITING IN TWO-PAGE DISPLAY

HANDWRITING IN ONE-PAGE DISPLAY (CONVENTIONAL)

HANDWRITING IN ONE-PAGE DISPLAY (PRESENT EMBODIMENT)

HANDWRITING IN TWO-PAGE DISPLAY

ONE-PAGE DISPLAY (CONVENTIONAL)

TWO-PAGE DISPLAY (PRESENT EMBODIMENT)

HANDWRITING IN TWO-PAGE DISPLAY

HANDWRITING IN ONE-PAGE DISPLAY (CONVENTIONAL)

ONE-PAGE DISPLAY (PRESENT EMBODIMENT)

ORDINARY DOCUMENT

TWO-PAGE DISPLAY

HANDWRITING

CHANGING BACK TO ONE-PAGE DISPLAY

METHOD OF PRESENT EMBODIMENT

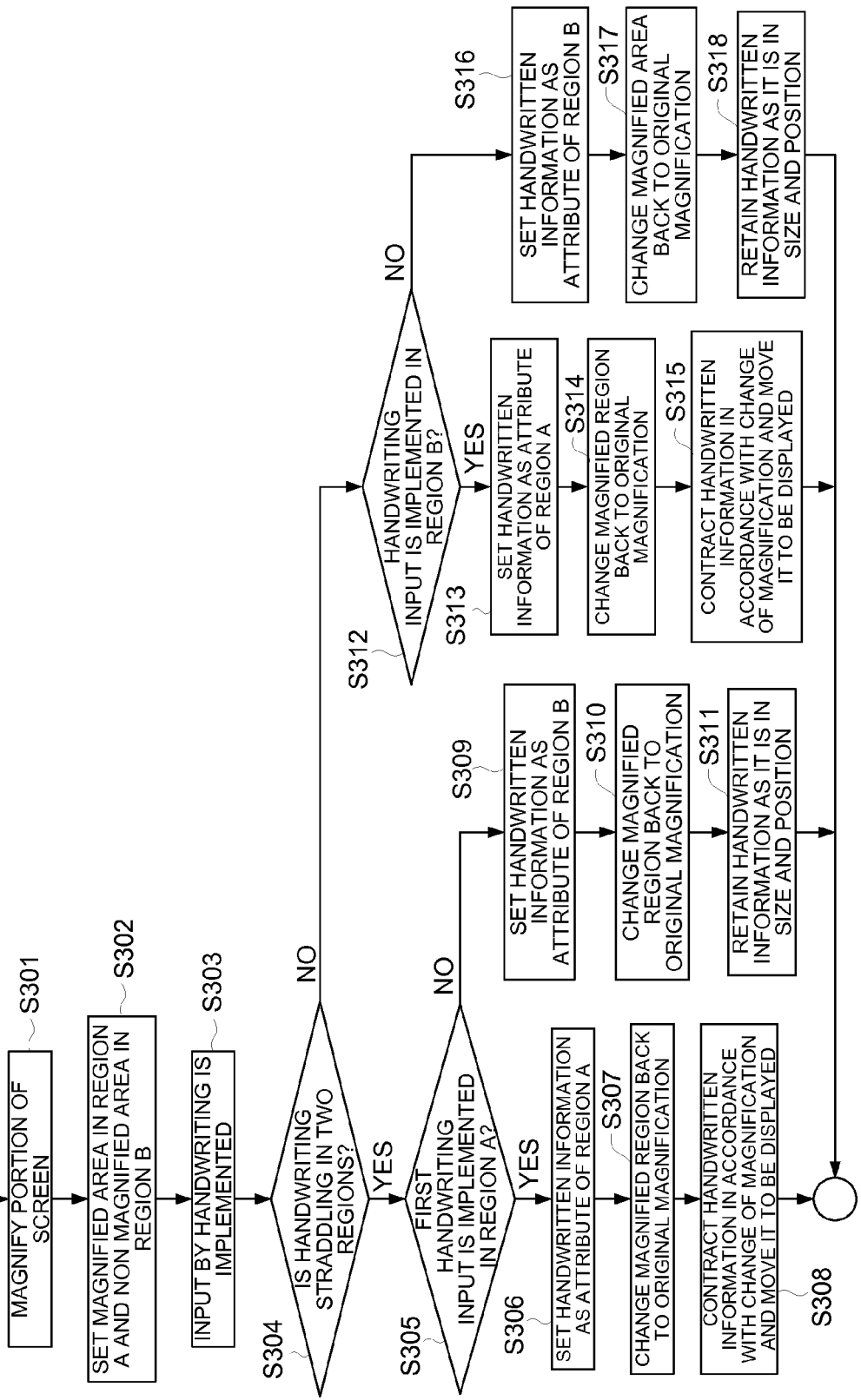

HANDWRITING IN PARTIAL MAGNIFICATION DISPLAY

IN CASE ONE-PAGE DISPLAY (CONVENTIONAL)

IN CASE ONE-PAGE DISPLAY (PRESENT EMBODIMENT)

HANDWRITING IN PARTIAL MAGNIFICATION DISPLAY

IN CASE ONE-PAGE DISPLAY (CONVENTIONAL)

IN CASE ONE-PAGE DISPLAY (PRESENT EMBODIMENT)

INCASE OF HANDWRITING
IN PARTIAL
MAGNIFICATION DISPLAY

IN CASE OF ONE-
PAGE DISPLAY
(CONVENTIONAL)

IN CASE OF ONE-PAGE
DISPLAY (PRESENT
EMBODIMENT)

ORDINARY DOCUMENT

PARTIALLY MAGNIFIED DOCUMENT

WHEN HANDWRITTEN IS INPUTTED

CONTRACTED DOCUMENT

METHOD OF PRESENT EMBODIMENT

CONTRACTED DOCUMENT

CONTRACTED DOCUMENT

HANDWRITING IN MAGNIFIED DOCUMENT

CONTRACTED DOCUMENT

INFORMATION BROWSING APPARATUS AND RECORDING MEDIUM FOR COMPUTER TO READ, STORING COMPUTER PROGRAM

This application is based on Japanese Patent Application No. 2011-259438 filed on Nov. 28, 2011, in Japanese Patent Office, the entire content of which is hereby incorporated by reference.

TECHNICAL FIELD

The present invention relates to an information browsing apparatus and a display control program, and in particular, to an image browsing apparatus provided with a touch panel which enables handwriting on a display screen and a display control program to operate the information browsing apparatus.

BACKGROUND OF THE INVENTION

In recent years, there has been an increasing number of users who brows documents such as information materials and books using apparatuses such as an electronic book provided with a display section. The above apparatus (hereinafter called "information browsing apparatus") is provided with a touch panel on a display section which enables input operation of characters and so forth by handwriting.

As to the input operation using the above touch panel, for example, Patent Document 1 (Japanese Unexamined Patent Application Publication NO. 2009-199621), discloses an electronic apparatus provided with a display section and a display device having a single point detection type device to detect a pointed position on the display section in a predetermined detection interval provided with a representing position determination device to determine a representing position representing a plurality of pointed positions detected within a unit time for the every unit time which is longer than a detection interval, a position identicalness judging device to judge whether or not the same pointed positions are detected continuously, based on whether or not the representing positions change within a predetermined range in which the pointed positions are deemed to be the same pointed positions, and an input range variable control device to vary an extent of the predetermined range in which the position identicalness judging device judges that the same position is continuously detected and to control identifying and displaying the input range portion thereof in the display section.

Also, in Patent Document 2 (Japanese Unexamined Patent Application Publication NO. 2008-084137), there is disclosed a portable electronic apparatus including: an input device to receive input of handwritten data, integrally configured on a display screen to display information, a data converting device to convert a predetermined bunch of handwritten data inputted via the input device into a piece of image data, a image contraction device to create a reduced-size image by contracting the image data with a fixed aspect ratio so that a width corresponding to line pitch of the image data becomes not more than a line pitch of a predetermined display area on a display screen, a display device to array the reduced-size image data sequentially in the predetermined display area and display, a display correction device to selectively correct a length of an entire line of the reduced-size image data sequentially arrayed when the reduced-size image data is arrayed sequentially and displayed, and a control device to control operation of the display correction device, wherein the control device is provided with a first threshold exceeding a maximum display length of a line displayable on the display device, and in case the entire length of one line of the contracted image data to be array sequentially exceeds the maximum display length and does not exceeds the first threshold, the display correction device conducts contraction correction so that the entire length of one line falls within the maximum display length.

Patent Document 1: Japanese Unexamined Patent Application Publication NO. 2009-199621

Patent Document 2: Japanese Unexamined Patent Application Publication NO. 2008-084137

As configurations to display documents on the information browsing apparatuses, there are a plurality of configurations, for example, a configuration to display one page and a configuration to display a plurality of pages (for example, two-page spread), where a user can change the display configuration in accordance with conditions of use. When this occurs, in case hand writing is carried out while displaying a document in the first display configuration then the first display configuration is changed to the second display configuration to display the document, forms of handwritten characters and figures are deformed or divided and meanings of handwritten information may become unable to be recognized.

For example, in a state that the display screen is configured with a plurality of regions in which images (for example, images of each page) of documents are displayed in respective regions, if handwriting is carried out in a way to straddle the plurality of the regions, thereafter the display configuration is changed (for example, if images of respective pages are displayed individually), only a portion of the handwritten information written in the object region for displaying is displayed and other portions written in other regions are not displayed. Therefore there is a problem that the meaning of the handwriting information cannot be recognized.

The present invention has one aspect to resolve the aforementioned problems, and an object of the present invention is to provide an information browsing apparatus and a display control method of the information browsing apparatus which enable appropriate display of information handwritten in a plurality of regions so that meaning of the handwritten information can be recognized.

SUMMARY

To achieve at least one of the abovementioned objects, an information browsing apparatus reflecting one aspect of the present invention is provided with a first display form and a second display form, including: a display section to display a document and handwritten information which shows a locus of an object on the display section; a touch panel disposed on a display surface of the display section so as to detect contact with the object, and a data processing section, wherein in the first display form the document is displayed on the display section as a single region and in the second display form the display section is divided into a plurality of the regions so as to display the document, and in case the handwritten information is inputted straddling two or more than two regions in the second display form, the data processing section judges to which region the handwritten information belongs, thereafter when the second display form is changed to the first display from, the data processing section displays all of the handwritten information in the region which the handwritten information is judged to belong thereto.

Also, a display control method of a browsing apparatus having a display section to display a document and handwritten information which shows a locus of an object on the display section, a touch panel disposed on a display surface of the display section so as to detect contact with the object and a data processing section, includes steps of: displaying the document on the display section as a single region in a first display form; diving the display section into a plurality of regions so as to display the document in a second display form; judging to which region the handwritten information belongs in case the handwritten information is inputted straddling two or more than two regions in the second display form, and displaying all of the handwritten information in the region which the handwritten information is judged to belong thereto by the data processing section when displaying in the first display form.

In the above apparatus and the method, in case the display screen is configured with a plurality of regions and the handwritten information is inputted in a way to straddle the plurality of the regions, the information browsing apparatus (display control method) judges in which region the starting position of the handwritten information belongs, sets an attribute of the handwritten information as the region of the starting position and moves and/or contracts the handwritten information belonging to the display object region based on said region to display when the display form is changed.

Also, in case the handwritten information including a plurality of components is inputted, it is judged that a component is inputted by handwriting and whether a subsequent component is inputted within a predetermined time, and if the subsequent component is inputted within the predetermined time, control to handle the above components as one batch of handwritten information is conducted.

Therefore, the user can recognize the meaning of the handwritten information correctly regardless of the regions, since the information inputted by handwriting in a discretional position on the display screen can be correctly displayed, even if the display form is changed.

BRIEF DESCRIPTION OF THE DRAWINGS

FIG. 9 is a flow chart indicating control (control in case handwritten is conducted in a partially magnified state) of an information browsing apparatus related to a first embodiment of the present invention.

DETAILED DESCRIPTION OF PREFERRED EMBODIMENTS

As stated in BACKGROUND OF THE INVENTION, the information browsing apparatuses such as tables, electronic paper and electronic book provided with touch panels on the display sections are widely used for applications to brows the documents such as the materials and books.

In the above information browsing apparatus, the documents can be displayed in a various display forms (for example, one region is assigned in a screen to displayed each page and the screen is divided into a plurality of regions to display a plurality of pages), however if handwriting is conducted so as to straddle the plurality of the regions in the screen and thereafter the display form is changed, the handwritten information is deformed and/or divided, as a result the meaning of the handwritten information cannot be recognized.

Thus, in an embodiment of the present invention, in case handwritten is conducted straddling the plurality of regions on the screen, an information browsing terminal controls in a way that a region to which the starting position of the handwritten information belongs is judged, the attribute of the handwritten information is set as the region of the starting position and when the display form is changed, the handwritten information belonging to the display object region is mover and/or contracted based on the region thereof. For example, after handwriting is conducted, straddling the plurality of regions (plurality of pages) in a state where page images of the document are displayed in respective regions, when each region (page) is displayed, all of the handwritten information can be displayed by contracting and moving the handwritten information belonging to the display objective region.

First Embodiment

Figure 1:
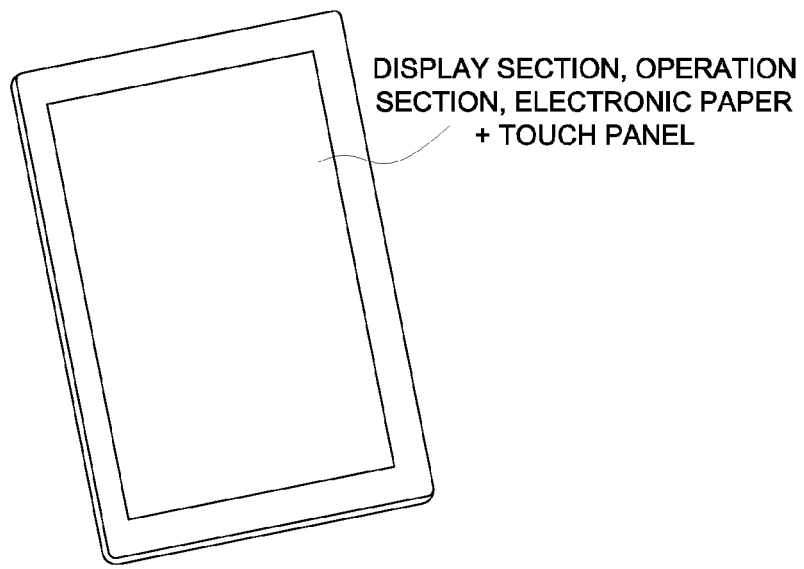
FIG. 1 is a perspective view showing an external appearance of an information browsing apparatus related to a first embodiment of the present invention.
Figure 2:
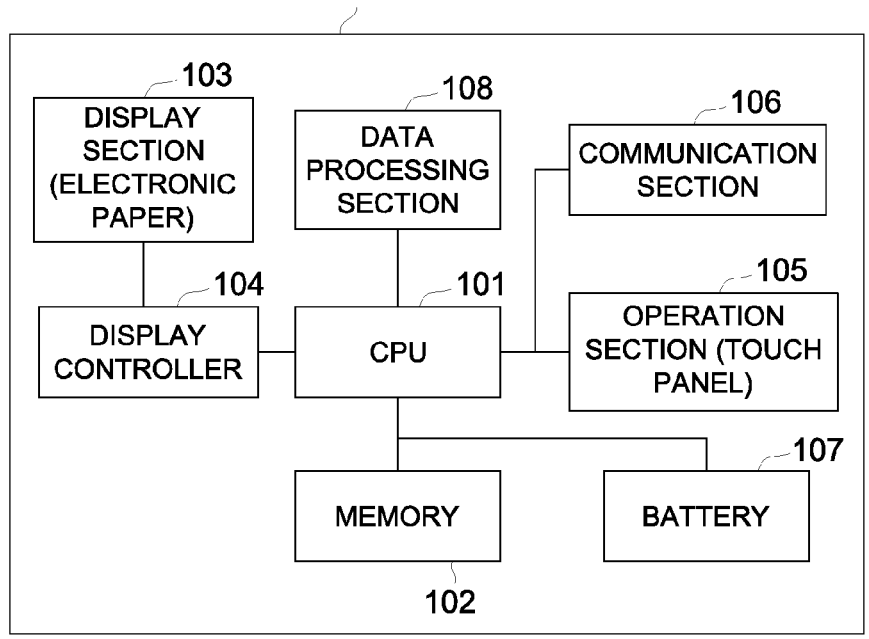
FIG. 2 is a block diagram showing a configuration of an information browsing apparatus related to a first embodiment of the present invention.
Figure 3:
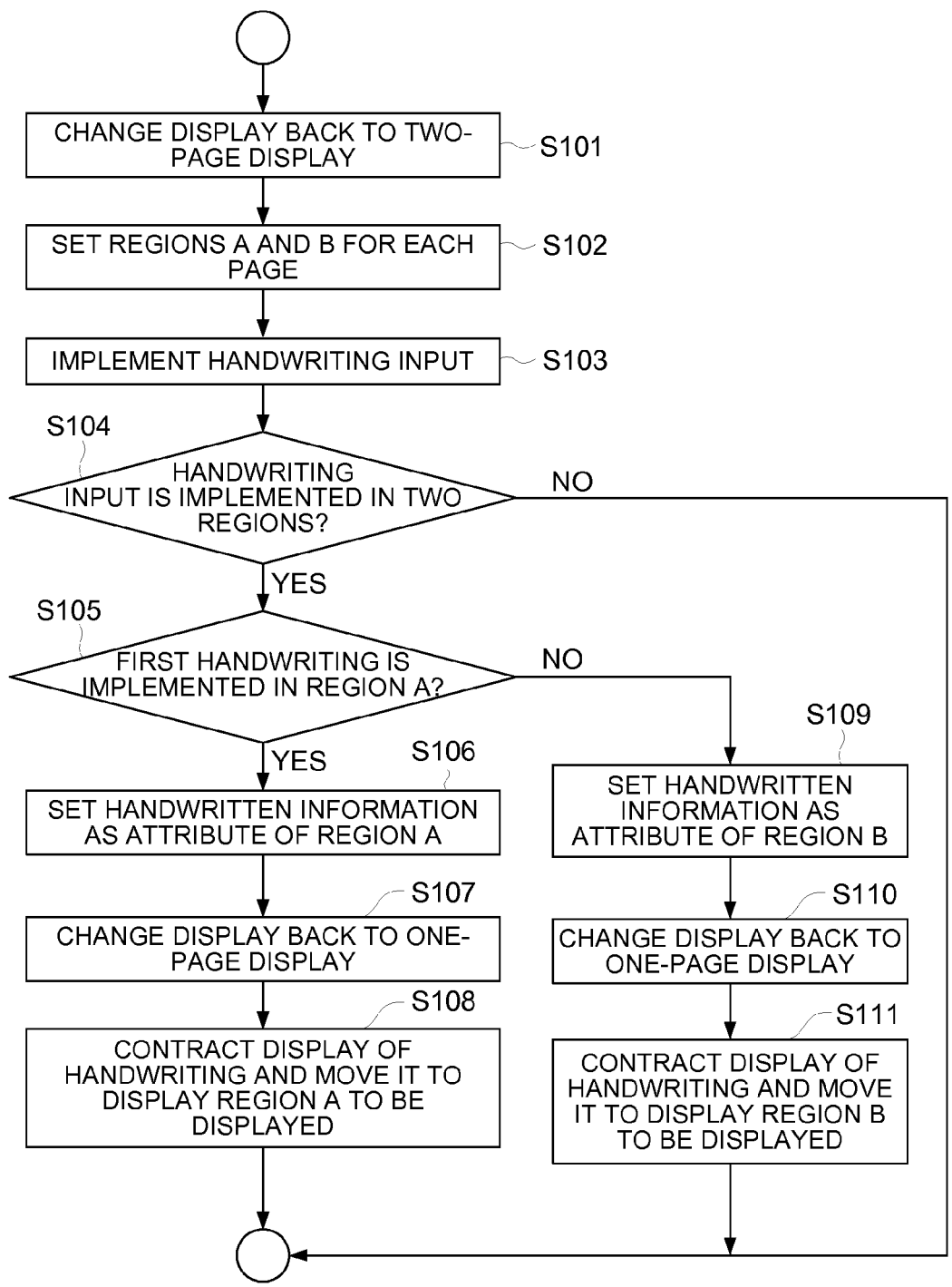
FIG. 3 is a flow chart indicating control (control in case handwriting is conducted in a state where two pages are displayed) of an information browsing apparatus related to a first embodiment of the present invention.
Figure 4:
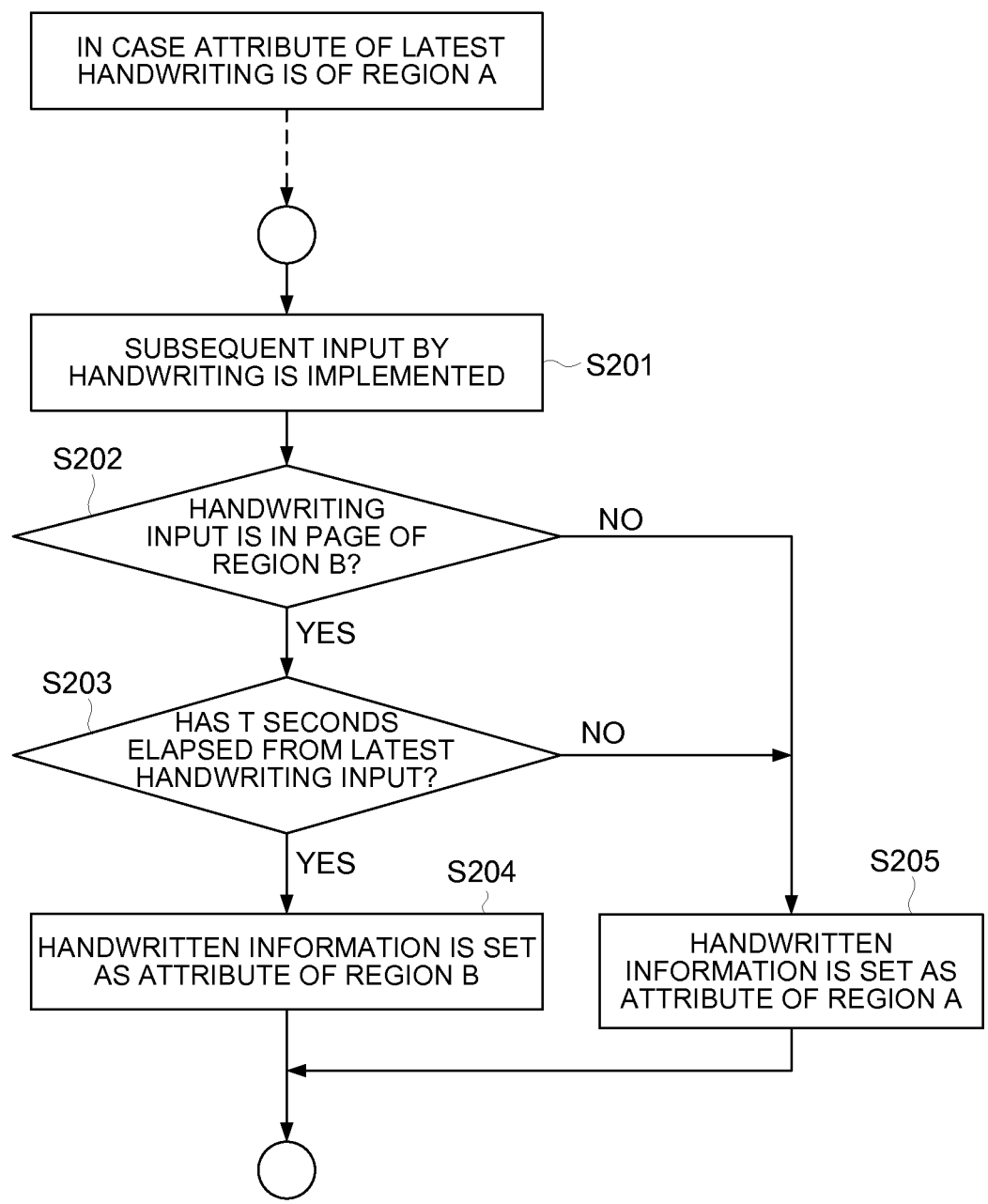
FIG. 4 is a flow chart indicating control (control in case handwriting is conducted subsequently) of an information browsing apparatus related to a first embodiment of the present invention.

In order to specifically describe the above embodiment of the present invention further, the information browsing apparatus and the display control method related to the first embodiment of the present invention will be described with reference to FIGS. 1 to 8. FIG. 1 is a perspective view schematically showing an external appearance of an information browsing apparatus related to present embodiment. FIG. 2 is a block diagram showing a configuration of the information browsing apparatus. Also, FIG. 3 and FIG. 4 are flow charts showing control of the information browsing apparatus of the present embodiment. Further, FIG. 5 to FIG. 8 are diagrams schematically showing exemplary displays thereof.

As FIG. 1 shows, an information browsing apparatus 100 of the present embodiment is an apparatus provided with display functions such as a notebook computer, a tablet terminal, an electronic paper, an electronic book, and a smart phone. As FIG. 2 shows, the information browsing apparatus 100 is configured with a CPU (Central Processing Unit) 101, a memory 102, a display section 103, a display controller 104, an operation section 105, a communication section 106, a battery 107 and a data processing section 108.

CPU 101 executes a control program read from the memory 102 and serves a function as a control section to control operation of each section.

The memory 102 is configured with a ROM (Read Only Memory) and a RAM (Random Access Memory) to store various kinds of programs executed by CPU 101, setting information to control operation of the information browsing apparatus 100 and various data (for example, document data).

The display section 103 is configured with an electronic paper (EPD: Electriphoretic Display), a liquid crystal display (LCD) or an organic EL (Electroluminescence) display to display documents and characters handwritten on a touch panel. Incidentally, the electric paper is a display device utilizing a configuration that transparent conductive electrodes are formed on inner surfaces of a pair of transparent film substrates, black toner having a conductive property and white toner having an insulation property are sealed between the electrodes, and by applying voltage between the electrodes the back toner is moved and replaced with the while toner, whereby color is changed.

The display controller 104 drives the display section 103 and controls display of the display section 103 in accordance with instruction of the CPU 101 and the data processing section 108.

The control section 105 is configured with hardware keys such as power button and a touch panel where transparent electrodes are arrayed in a grid on the display section 103. The touch panel outputs a signal from the transparent electrode disposed at a portion in contact with an object to the CPU 101 and the data processing section 108.

The communication section 106 is a NIC (Network Interface Card) or a modem which communicate with a computer or a server connected with a network via wireless or wired communication.

The battery 107 is a secondary battery to supply electric power for driving each section of the information browsing apparatus 100.

The data processing section 108 recognizes a region of an image (for example, in case a plurality of pages are displayed, the region of each page) displayed on the display section 103, and judges whether or not the hand written characters and figures (hereinafter called handwritten information) range over a plurality of regions, when input by handwriting is detected via the touch panel.

In case the handwritten information is straddling the plurality of regions, the region in which first handwritten information is inputted is specified and the attribute of the handwritten information (characters and figures inputted by handwriting in advance in a predetermined time) in a group is set as the specified region. In case the display form of the specified region is changed (for, example, a display form of multiple pages is changed into a display form of a page of the specified region only), the handwritten information belonging to the specified region is contracted and moved to the said region so that all of the handwritten information belonging to the said region can be displayed.

When this occurs, the data processing section 108 can create a composite image by combining a page image in the specified region and the handwritten information and display the composite image on the display section 103 (namely, the data processing section 108 can serve both a handwritten control function to control the handwritten input and a display control function to control display). Also, it is possible that the page image of the specified region, the handwritten information and layout information of the handwritten information are transmitted to the display control function (display controller 104), and the display control function overlaps the handwritten information on the page image based on the layout information to displays it on the display section 103 (namely, the data processing section 108 only has the handwriting control function and existing display control function is used). Also, the data processing section 108 can be configured with a hardware or a control program (a program performs a handwriting control function and a display control function or solely the handwritten control function) executed by $CPU_{101}$.

Incidentally, FIG. 2 is an example of information browsing apparatus 100 of the present embodiment of which configuration can be modified appropriately.

When a document is displayed on the information browsing apparatus 100, usually the document is displayed one page by one page, though there is also an occasion that multiple pages are desired to be browsed simultaneously. In the above occasion a plurality of pages i.e. two or four pages are apposed to be displayed. In case handwriting is performed in a state that the plurality of pages are displayed, if the handwriting region is assigned for each page, the hand written information may straddle a region of another page. Thereafter, if the number of the pages is reduced (for example, four pages to two pages or one page, or two pages to one page), since the handwritten information is divided and only a portion of the handwritten information in the displayed page is displayed, the meaning of the handwritten information cannot be recognized.

Thus, in the present embodiment, when the number of the pages is reduced (for example, reduced to one page), by moving the handwritten information straddling the plurality of the pages to a page to be displayed or by contracting and moving it, the handwritten information can fall within the objective page to be displayed.

Operation of the browsing apparatus 100 in the above case will be described with reference to the flow chart in FIG. 3. Incidentally, while the operation that handwriting is conducted in a state where two pages are displayed will be described, it can be applied to handwriting in a state where more than two pages are displayed.

First, a user selects a document by operating an operation section 105 of the browsing apparatus 100 so as that the display section 103 displays the document. When changing of the display form to the two-page display form is instructed via a predetermined operation, the data processing section 108 displays a page image of two-page spread on the display section 103 in accordance with the instruction (S101).

Next, the data processing section 108 sets regions (here region A and region B) for respective pages (S102), then when handwriting using a touch panel is detected (S103), whether or not the hand writing is performed straddling the two regions is judged (S104). In case the handwriting does not straddle the two regions (S104: No), the process is terminated since a positional relation between the page image and the handwritten information is not destroyed even if the display form is changed to one-page display form.

On the other hand, in case the handwriting is performed straddling the two regions (S104: Yes), the data processing section 108 judges whether or not the region in which the handwriting is inputted first (start position of the handwriting) is region A (S105). In case the region in which the handwriting is first inputted is the region A (S105: Yes), the data processing section 108 sets and registers an attribute of the handwriting information as the region A (S106), and when the display form is changed back to the one-page display form (S107), the data processing section 108 moves the handwriting information within the page of the region A or contracts and moves to display it (S108). In case the handwriting is first performed in the region B (S105: No), the data processing section 108 sets and registers the attribute of the handwriting information as the region B (S109), then when the display form is changed back to the one-page display form (S110), the data processing section 108 moves or contracts and moves the handwritten information to the page of the region B to display it (S111).

Incidentally, when the handwritten information is contracted and moved, the data processing section 108 can create a combined image in which the page image and the handwritten information contracted and moved are combined and transmit the combined image to the display section 103, or the data processing section 108 can transmit the page image, the handwritten information contracted and moved and the layout information of the hand written information on the page to the display control function then the display control function can overlap the page image and the handwritten information based on the layout information and display it on the display section 103.

FIG. 5 schematically indicates how a continuous figure is shown when the continuous figure is handwritten so as to straddle two pages in the two-page display form.

Figure 5A:
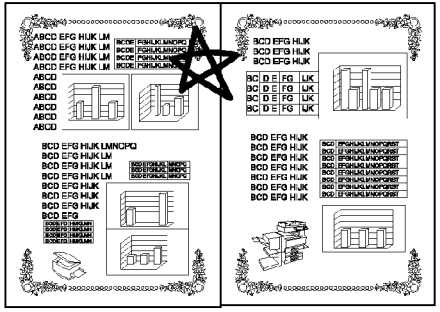
FIGS. 5a-5c are a diagram schematically showing an exemplary display (an example that a continuous figure is handwritten straddling two pages) of an information browsing apparatus related to a first embodiment of the present invention.
Figure 5B:
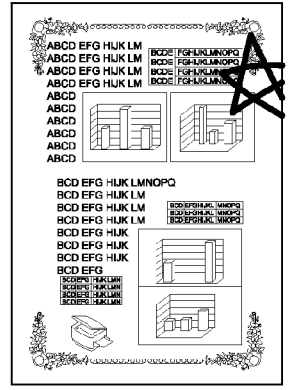
Figure 5C:
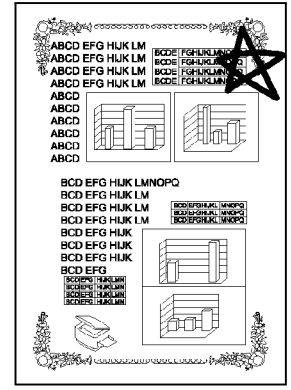

As FIGS. 5a, 5b, and 5c shows, after inputting the handwritten information (a star shaped figure written in one stroke having a left end section as a start point) so as to straddle two pages in the two-page display form the display form is changed back to the one-page display form so as to display only left page. Then as FIG. 5b shows, in the past, only a portion handwritten on the left page has been displayed and other portion handwritten in the right page has not been displayed. On the other hand, in case of the present embodiment, since the data processing section 108 sets the attribute of the handwritten information as the left page and moves or contracts and moves the handwritten information to the objective left page to be displayed, as FIG. 5c shows, an entire handwritten information is displayed.

Incidentally, the contraction ratio, the moving amount, the layout of the handwritten information cannot be limited in particular. For example, in case the handwritten information can fall within the objective page to be displayed as it is, the handwritten information is moved without being contracted.

When setting the attribute of the handwritten information, in case figures and characters configured with a plurality of lines are handwritten so as to straddle a plurality of regions, if the above processing is carried out, the plurality of lines configuring figures and characters may be judged that they belong to separate regions. In the same manner, in case words and sentences configured with a plurality of characters are inputted in a way to straddle the plurality of the regions, if the above processing is carried out for each character, a plurality of characters configuring one word or one sentence may be judged that they belong to separate regions. Therefore, in the present embodiment, handwriting information inputted within a predetermined time from determination of the region to which latest handwriting information inputted immediately before belongs, is judged to belong to the same region as that the handwriting information inputted immediately before belong to. Whereby, in the present embodiment, by judging that the handwritten information inputted within the predetermined time after determining the region to which the handwritten information inputted immediately before belongs to the same, separation of figures, characters, words and sentences in the group despite the intention is obviated.

Operation of the information browsing apparatus 100 in the above case will be described with reference to the flow chart in FIG. 4. Incidentally, while a case that handwriting is performed in a state that two pages are displayed will be described, it can be applied to a case that more than two pages are displayed in the same manner.

In a flow chart in FIG. 4, in case that the attribute of the handwritten information is of the region A, the data processing section 108 judges whether or not the start position of the handwritten input is in the page of the region B (S202) when handwriting is subsequently inputted (S201). In case the start position of the handwritten input is in the page of the region A (S202: No), attribute of the handwritten information is assigned to be of the region A (S205).

On the other hand, in case the attribute of the handwritten input is of the region B (S202: Yes), the data processing section 108, judges whether or not the predetermined time (for example T sec.) has elapsed from the latest handwritten inputted immediately before (S203).

If T sec. has elapsed from the input of the latest handwritten (S203: Yes), since the latest handwritten input is deemed not to be related, the data processing section 108 registers the handwriting information as an attribute of the region B (S204). On the other hand, if T sec. has not elapsed from the latest input of handwriting (S203: No), the latest handwritten information is deemed to be related, the data processing section 108 registers the hand written information as an attribute of the region A (S205).

Incidentally, the elapsed time of "T second" can be set discretionary, for example, for a user quickly input the handwritten information "T" is set short and for a user slow to input 'T' is set longer, thus multiple pieces of handwritten information can be correlated to each other as the user intends.

FIG. 6 and FIG. 7 schematically show how the figures and characters in the group are display when they are inputted by handwriting in a way to straddle two pages in the two-page display form and the two-page display form is changed back to the one-page display form.

Figure 6A:
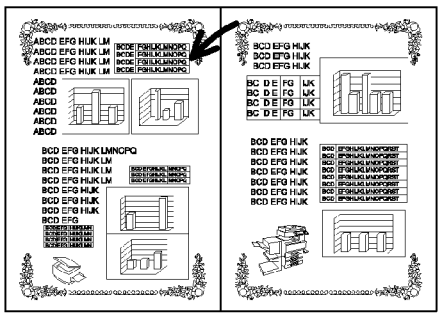
FIGS. 6a-6c are a diagram schematically showing an exemplary display (an example that a character is handwritten straddling two pages) of an information browsing apparatus related to a first embodiment of the present invention.
Figure 6B:
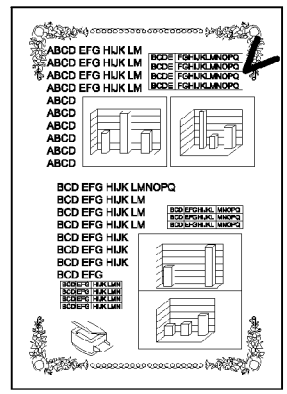
Figure 6C:
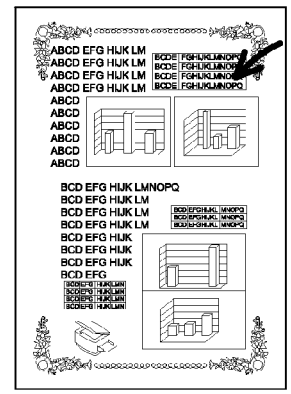

As FIG. 6a shows after inputting handwritten information (here, a line extending from a right page to a left page and an arrow on an end thereof) then displaying only the left page by changing back to the one-page display, conventionally, as FIG. 6b shows only the figure (arrow mark on the end) belonging to the left page has not been displayed and the figure (the line) belonging to the right page has not been displayed. On the other hand, in the present embodiment, the data processing section 108 sets the attribute of the group of the handwritten information as the left page, and the handwritten information can be moved to the object page to be displayed or can be contracted and moved, thus as FIG. 6c shows, the entire handwritten information can be displayed. Incidentally, when moving and contracting, the group of the handwritten information can be moved and contracted integrally, or the handwritten information (here the line) whose start position does not belong to the object page to be displayed can only be moved or contracted without contracting or moving the handwritten information (here the arrow mark on the end) whose start position does not belong to the object page to be displayed.

Figure 7A:
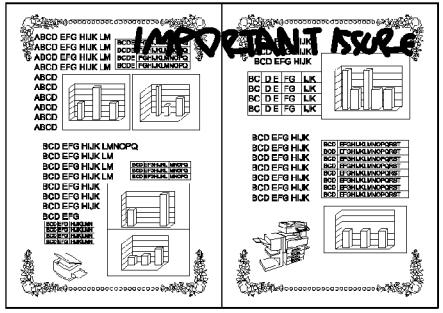
FIGS. 7a-7c are a diagram schematically showing an exemplary display (an example that a plurality of characters are handwritten straddling two pages) of an information browsing apparatus related to a first embodiment of the present invention.
Figure 7B:
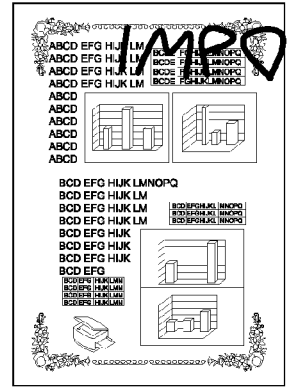
Figure 7C:
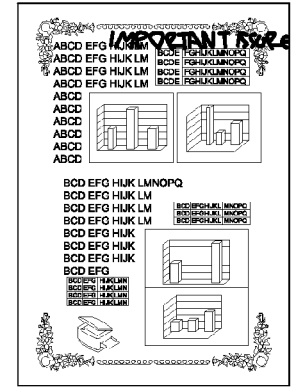

Also, as FIG. 7a shows, after inputting the handwritten information (here word "Important issue") so as to straddle two pages in the two-page display form, by changing back to the one-page display form so as to display left page only, conventionally, as FIG. 7b shows, only the word "Important" belonging to the left page has been displayed and the word "issue" belonging to the right page has not been displayed. On the other hand, in the present embodiment, the data processing section 108 sets the attribute of the handwritten information in the group as the left page and moves the handwritten information to the object page to be displayed or contracts and moves the information, whereby as FIG. 7c shows, all of the handwritten information can be displayed.

FIG. 8 schematically shows how the handwriting information configured with figures and characters are display when they are inputted by handwriting in the two-page display form and then the two page display form is changed back to the one-page display form.

Figure 8A:
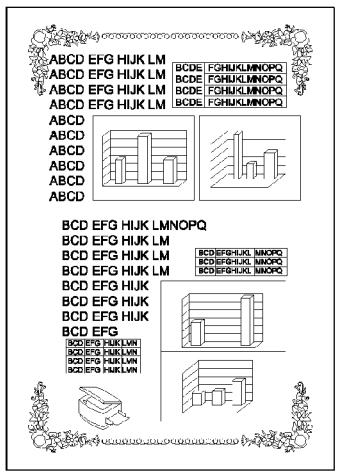
FIGS. 8a-8e are a diagram schematically showing an exemplary display (an example that information including a plurality of characters and figures is handwritten straddling two pages) of an information browsing apparatus related to a first embodiment of the present invention.
Figure 8B:
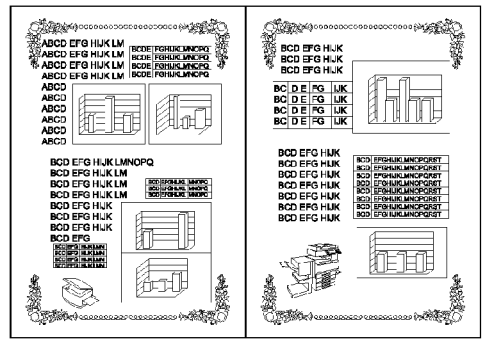
Figure 8C:
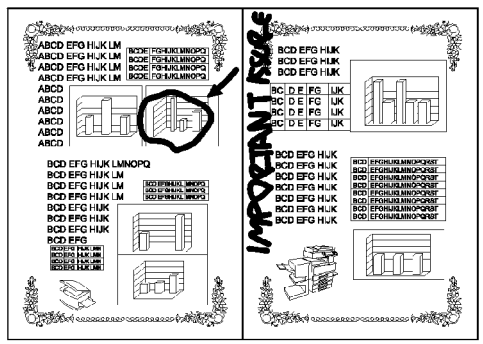
Figure 8D:
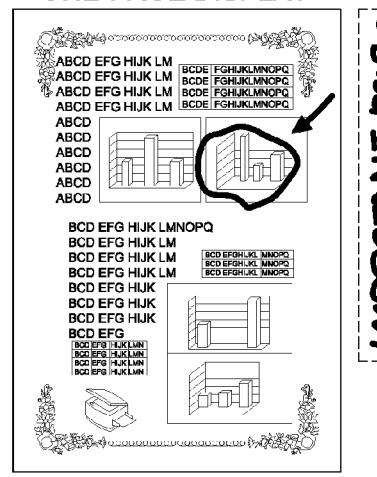
Figure 8E:
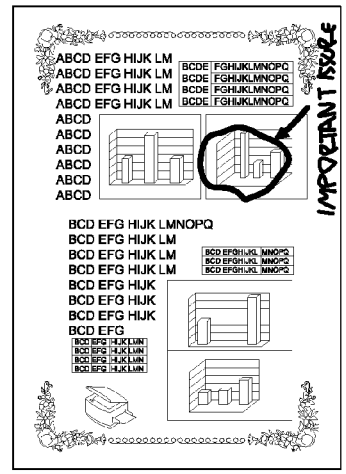

First, a document (refer to FIG. 8a) displayed in the one-page display form is changed to be displayed in the two-page display form (refer to FIG. 8b). Then, handwriting (here, figures of a circle and an arrow hand written in the left page and characters of "Important Issue" handwritten in the right page) is performed so as to straddle the two pages (refer to FIG. 8c), and then the two-page display form is change back to the one page display form so as to display only the left page (refer to FIG. 8d). Whereby, conventionally, the figures i.e. the circle and the arrow handwritten in the left page are only displayed but the characters handwritten in the right page is not displayed, thus the meaning of the handwritten information cannot be recognized. In contrast, in the present embodiment, the data processing section 108 recognizes the characters handwritten in the page which is not object for display (right page) as the group of the handwritten information and moves them to the objective page to be displayed or contracts and moves them, whereby all of the handwritten information can be displayed and the meaning of the handwritten information can be understood (refer to FIG. 8e).

Second Embodiment

Figure 10:
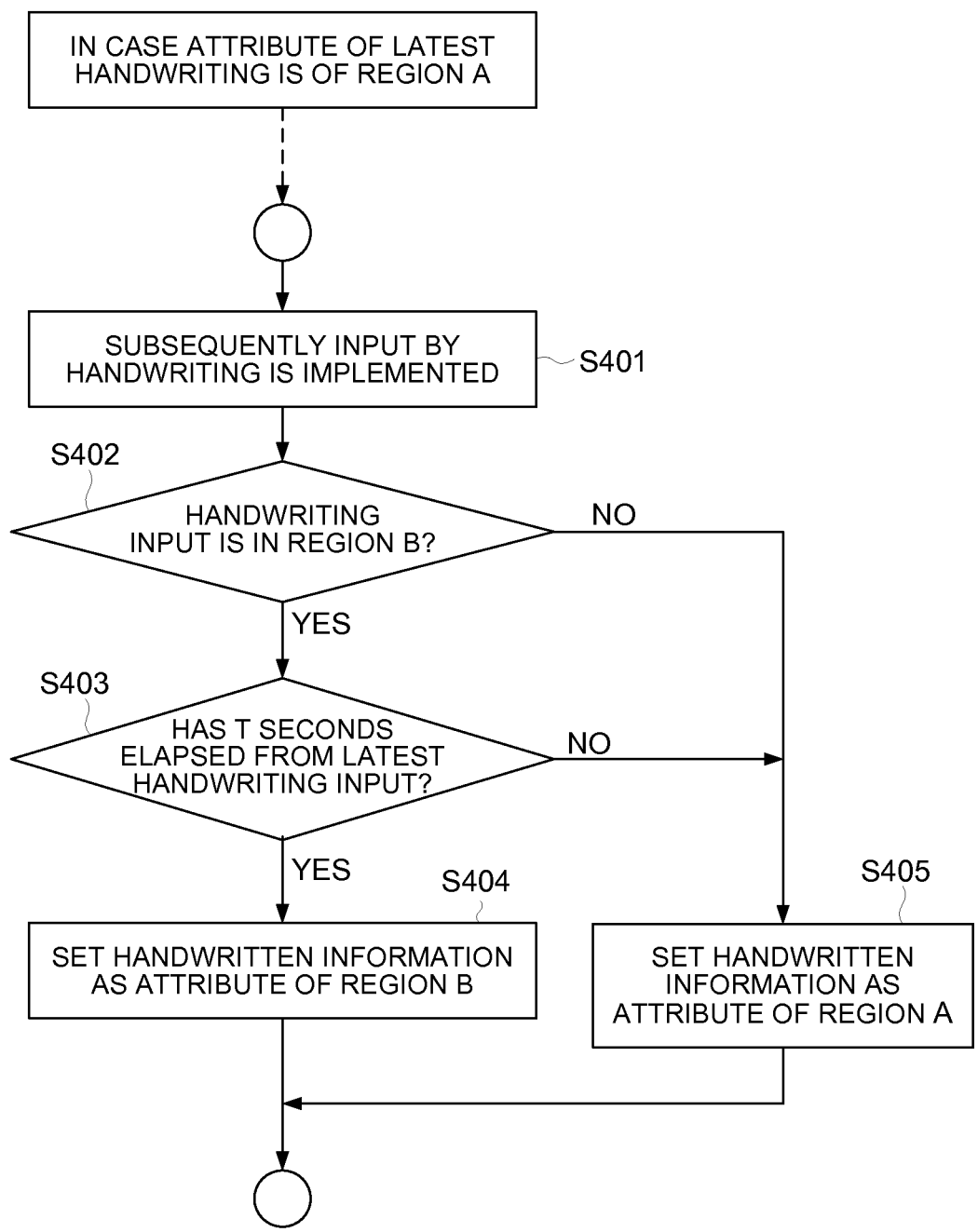
FIG. 10 is a flow chart indicating control (control in case handwriting is conducted subsequently) of an information browsing apparatus related to a second embodiment of the present invention.

Next, an information browsing apparatus and a display control program related to the second embodiment of the present invention will be described with reference to FIG. 9 to FIG. 16. FIG. 9 to FIG. 10 are flow charts showing control of the browsing apparatus of the present embodiment and FIG. 11 and FIG. 16 are diagrams showing exemplary displays thereof.

In the first embodiment while the case that the handwriting is performed in the state that the plurality of pages are displayed has been described, there is a case that the screen is magnified since the characters and figures are small when browsing the documents. When this occurs, there is a case that only a desired region to be magnified is magnified so that a total layout can be observed, and further there is a case that hand writing is performed in the state of partial magnification. There is no apparatus which enables handwriting input in the above partial magnification state. However if handwriting is possible, since the magnifications are different in the partial magnified region (hereinafter called magnified region) and other regions (hereinafter called normal regions), when the magnification of the magnified region is changed back to original, the shape of the hand writing is deformed or divided and the meaning of the handwritten information becomes impossible to be recognized.

Here, in the present embodiment, in case that handwriting is performed so as to straddle the magnified region and the normal region in the state that the document is partially magnified, and thereafter the magnification of the magnified region is changed back to the original magnification, the handwritten information belong to the magnified region is moved or contracted and moved in accordance with a change of the magnification of the magnified region.

In the above case, while a basic configuration of the information browsing apparatus 100 is the same as that of first embodiment, the data processing section 108 of the present embodiment recognizes a region of an image displayed on the display section 103 (for example, the magnified region and the normal region in case of partial magnification) and when handwriting on the touch panel is detected, whether or not the handwritten information is straddling the plurality of the regions is judged. In case the handwritten information straddles the plurality of the regions, a region in which a first handwriting is performed is specified and an attribute of a group of the handwritten information (characters and figures handwritten within a predetermined time period) is set as the specified region. Then if the display form of the specified region is changed (for example, when the magnification of the magnified region is changed back to the original magnification), the handwritten information belonging to the magnified region is moved or contracted and moved so that the handwritten information belonging to said region is displayed to be readable.

Incidentally, in the same manner as the first embodiment, the data processing section 108 can create a combined image in which the page image including the specified region and the handwritten information are combined and the combined image is displayed on the display section 103 (namely, the data processing section 108 serves both a handwriting control function to control the handwriting input and a display control function to control display), or the data processing section 108 can transmit the page image including the specified region, the handwritten information and layout information of the handwritten information to display control function (display controller 104), which controls display, and overlap the handwritten information with the page image including the region specified by the display control function based on the layout information so as to be displayed on the display section 103 (namely, the data processing section 108 posses only the control function and an existing display control function can be used). Incidentally, the data processing section 108 can be configured as hardware or a control program operated on the CPU101 (a program operated as the handwriting control function and the display control function or solely as the handwriting function).

The operation of the information browsing apparatus 100 with the above configurations will be described with reference to the flow chart in FIG. 9 as follow.

First, the user operates the operation section 105 of the information browsing apparatus 100 to select a document and display it on the display section 103. When partial magnification of the document is instructed through a pre-determined operation, the data processing section 108 magnifies a part of the document and displays it on the display section 103 (S301). Incidentally, when the part of the document is magnified and displayed, the partial magnified image can be disposed on the image of the original document (on a separate layer) or a combined image in which the image of the original document and the partial magnified image are combined can be displayed.

Next, the data processing section 108 sets the magnified region in a region A and the other normal regions (non-magnified regions) are set in the region B (S302), then when handwriting input using the touch panel is detected (S303), the data processing section 108 judges whether or not the handwriting is performed, straddling two regions (S304).

In case the handwriting is performed, straddling two regions (S304: Yes), the data processing section 108 judges whether or not the region (handwriting start position) in which first handwriting is inputted is region A (S305). In case the region in which first handwriting is inputted is the region A (S305: Yes), the data processing section 108 sets and registers the attribute of the handwritten information as the region A (S306), and contracts the handwritten information in accordance with a change of the magnification and move it to a predetermined position to display it (S308) when the magnified region is changed back to the original magnification (S307). In case the region in which the first handwriting is inputted is the region B (S305: No), the data processing section 108 sets and registers the attribute of the handwritten information as the region B S309), then when the magnification of the magnified region is changed back to the original magnification (S310), the handwritten information is maintained as it is in the size and the position (S311).

On the other hand, in case the handwritten information is not straddling two regions (S304: No), the data processing section 108 judges whether or not the region in which the handwriting is inputted is the region A (S312). In case the region in which the handwriting is inputted is the region A (S312: Yes), the data processing section 108 sets and registers the attribute of the handwritten information as the region A (S313), and contracts the handwritten information in accordance with the change of the magnification when the magnified region is changed back to the original magnification (S314), then moves it to a predetermined position to display it (S315). Also, in case the region in which the handwriting input is performed is the region B (S312: No), the data processing section 108 registers the handwritten information as an attribute of the region B (S316), and maintains the handwritten information as it is in the size and the position (S318).

Incidentally, when the handwritten information is contracted and moved to be displayed, the data processing section 108 can create a combined image which the page image and the contracted and moved handwritten information are combined and transmit the combined image to the display section 103, or the data processing section 108 can transmit the page image, the contracted and moved handwritten information and the layout information of the handwritten information on the page to the display control function, then the display control function can overlaps the page image and the hand written information based on the layout information so as to display it on the display section 103.

FIG. 11 schematically shows how a stretch of figure is shown when the figure handwritten, straddling a magnified region and a normal region in a display form where a portion is magnified, then the magnified region is changed back to an original magnification.

Figure 11A:
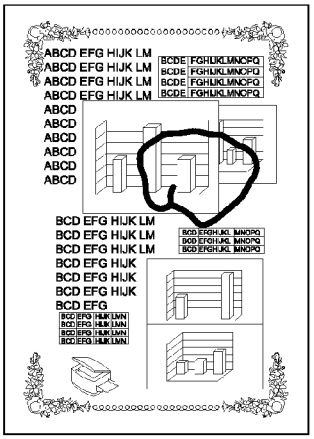
FIGS. 11a-11c are a diagram schematically showing an exemplary display (an example that a continuous figure is handwritten straddling a magnified region and a normal region) of an information browsing apparatus related to a second embodiment of the present invention.
Figure 11B:
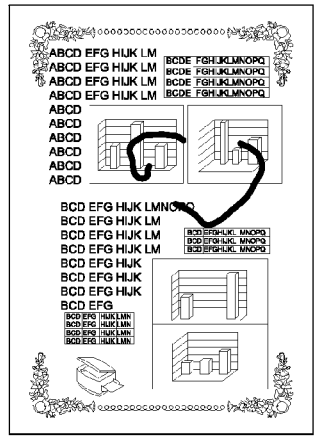
Figure 11C:
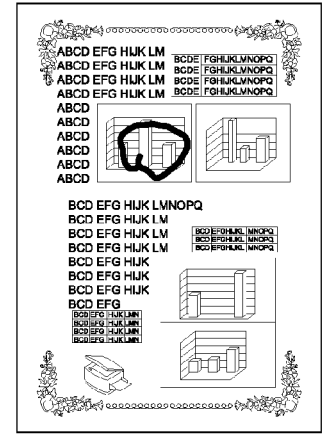

As FIG. 11a shows, in case a portion of a document is magnified and displayed, and in this state, handwriting information (here a circle figure configured with a continuous line starting from a left end section) is inputted so as to straddle the magnified region and a normal region then the magnified region is changed back to normal magnification, conventionally, as FIG. 11b shows, only a portion of the handwriting information in the magnified region (a portion of the circle) is contracted and other portion of the handwriting information in the normal region is displayed as it is, thus the handwritten information is separated. On the other hand, in the present embodiment, the data processing section 108 judges that the entire circle figure belongs to the magnified region and moves the entire circle figure to the magnified region or contracts and moves the figure. Whereby, as FIG. 11c shows, the handwritten information cannot be separated.

Incidentally, in the same manner as the first embodiment, a contraction ratio, a moving amount and a layout of the handwritten information are not restricted. For example, in case it is not a problem that the handwritten information is allocated in the magnified region as it is, the hand written information does not have to be contracted.

When the attribute of the handwritten information is set, in the same manner as the first embodiment, in case figures and characters configured with a plurality of lines are inputted so as to straddle a plurality of the regions, if the aforesaid process is carried out for each line, the plurality of the lines configuring the figures and characters are judged that they belong to separate regions. Also, in case words and sentences configured with a plurality of characters are inputted to straddle a plurality of pages, if the aforesaid process is carried out for each characters, it may be judged that the plurality of the characters configuring one word or one sentence belong to separate regions. Therefore, in the present embodiment, the hand written information inputted within a predetermined time from determination of a region in which latest handwritten information belongs is judged to belong to the same region as the latest handwritten information. Whereby, it prevents the figures, characters, words and sentences in a group from separating against user's intention.

Operation of the browsing apparatus 100 in the above case will be described with reference to the flow chart in FIG. 10.

In the flow chart in FIG. 9, if the attribute of the latest handwritten information is of the region A, when an input is performed by handwriting subsequently (S401), the data processing section 108 judges whether or not a start position of the subsequent input by handwriting is in the region B (S402). In case the start position of the input by handwriting is in the region A (S402: No). The handwritten information is set as an attribute of the region A (S405).

On the other hand, in case the start position of the handwriting input is in the region A (S402:Yes), the data processing section 108 judges whether or not a predetermined time (for example, T sec.) has elapsed for a latest handwritten input (S403).

In case T sec has elapsed from the latest handwritten input (S403: Yes), the data processing section 108 sets and register the attribute of the handwriting information as the region B (S404) since the latest handwritten input is deemed not to be related. Contrarily, in case T sec. has not been elapsed from the latest handwritten input (S403: No), the data processing section 108 sets and registers the attribute of the handwritten information as the region A (S405), since the latest handwritten input is deemed to be related.

Incidentally, the T sec can be discretionary set. For example, T sec is set shorter for a user who inputs the handwriting information quickly, and longer for a user who input that slowly. Whereby, the plurality of pieces of the handwritten information can be related as the user intends.

FIG. 12 and FIG. 13 schematically show how figures and characters in a group are displayed when they are handwritten in a way to straddle a magnified region and a normal region in a state of partial magnified display, and then the display magnification ratio of the partial magnified region is changed back to original one. Incidentally, conventional control in the following figures is usual control provided that an apparatus capable of handwriting input in the state of partial magnified display, the figures do not intend to indicate that such control has been conducted in the past.

Figure 12A:
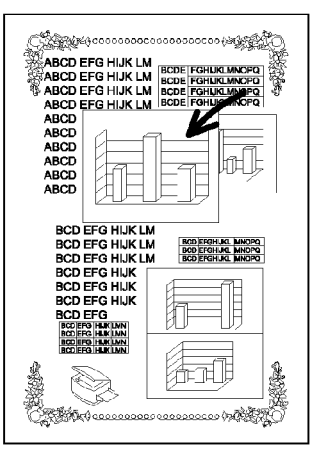
FIGS. 12a-12c are a diagram schematically showing an exemplary display (an example that a character is handwritten straddling a magnified region and a normal region) of an information browsing apparatus related to a second embodiment of the present invention.
Figure 12B:
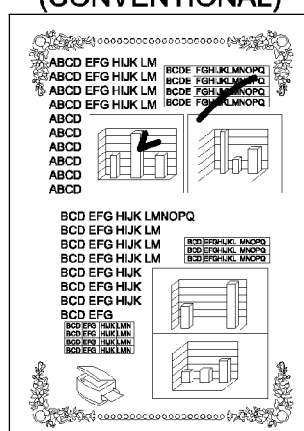
Figure 12C:
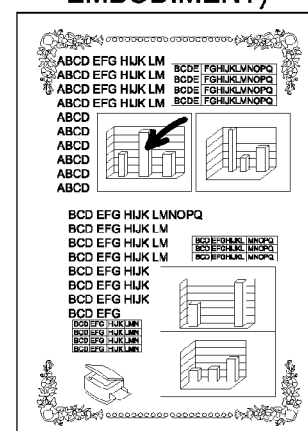

As FIG. 12a shows, after inputting the handwritten information (here, one line extending from the normal region to the magnified region and an arrow mark on the end thereof), the display magnification of the magnified region is changed back to original. Whereby, in the past, as FIG. 12b shows, only the figure (the arrow mark on the end) belonging to the magnified region has been contracted and the figure (the line) belonging to the normal region has been displayed as it is. On the other hand, in the present embodiment, the data processing section 108 sets the attribute of the handwritten information in the group as the magnified region so as to move them to the magnified region or contracts them in accordance with change of the magnification and moves to the magnified region. Thus as FIG. 12c shows, whole handwritten information can be displayed. Incidentally, when contracting and moving, the handwritten information in the group can be contracted and moved integrally, or the information whose starting poison belongs to the magnified region (here the arrow mark on the end) is only contracted and the information whose starting position belongs to the normal region (here the line) can be contracted and moved.

Figure 13A:
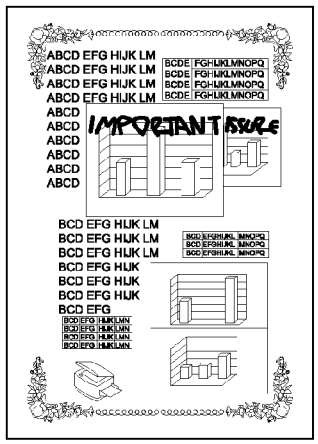
FIGS. 13a-13c are a diagram schematically showing an exemplary display (an example that a plurality of characters are handwritten straddling a magnified region and a normal region) of an information browsing apparatus related to a second embodiment of the present invention.
Figure 13B:
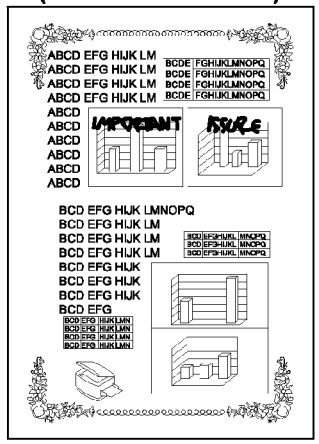
Figure 13C:
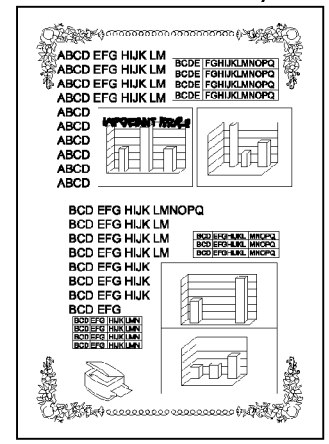

Also, as FIG. 13a shows, after inputting handwritten information (words of "important issue") so as to straddle a magnified region and a normal region in a state of partially magnified display, the display magnification of the magnified region is changed back to an original magnification. Whereby, in the past, as FIG. 13b shows, only the word belonging to the magnified region (here "important") is contracted and displayed, and the word "issue" belonging to the normal region is displayed as it is. In contrast, in the present embodiment, the data processing section 108 sets the attribute of the handwritten information in a group as the magnified region so as to move the handwritten information to the magnified region or to contract the handwritten information in accordance with the change of the magnification of the magnified region and move. Whereby, as FIG. 13c shows, the whole handwritten information can be displayed.

FIG. 14 schematically shows how the hand written information is displayed when the handwritten information configured with figures and characters is inputted in a display form of partial magnification display and then the display magnification of the magnification region is changed back to an original one.

Figure 14A:
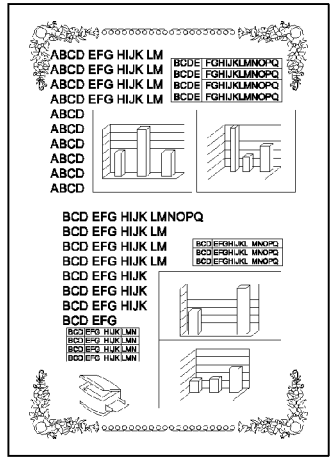
FIGS. 14a-14e are a diagram schematically showing an exemplary display (an example that information including a plurality of characters and figures is handwritten straddling a magnified region and a normal region) of an information browsing apparatus related to a second embodiment of the present invention.
Figure 14B:
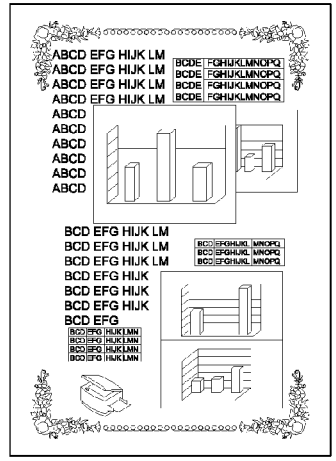
Figure 14C:
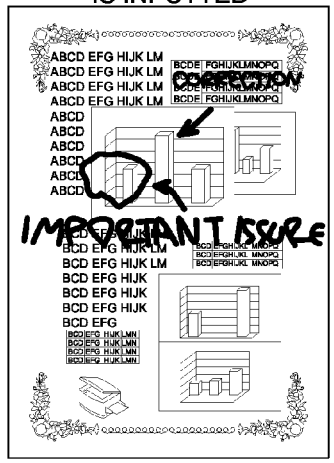

First, a part of the document of normal display (refer to FIG. 14a) is magnified and displayed (refer to FIG. 14b). In the above state, handwriting is performed so as to straddle the magnified region and the normal region (here a circle, two figures of arrows and part of word "important" are handwritten in the magnified region and a part of word "important" and a word "correction" are handwritten in the normal region), (refer to FIG. 14c).

Figure 14D:
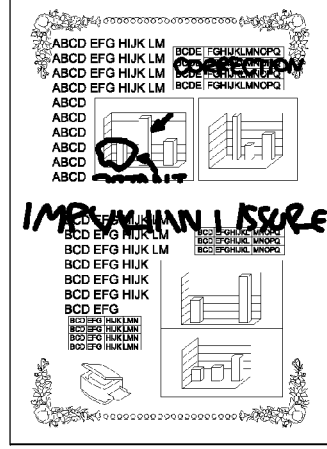
Figure 14E:
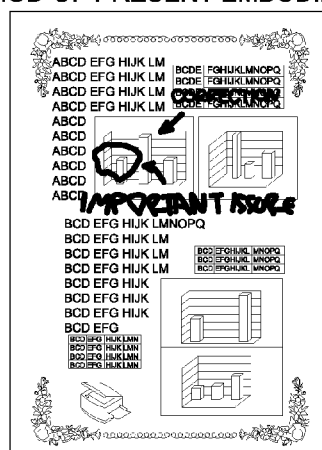

When the display magnification is changed back to the original, as FIG. 14d shows, in the past, since only a circle, two figures of arrows and a part of the word "important" handwritten in the magnified region have been contracted and the word handwritten in the normal region has been displayed as it is, meaning of the handwritten information has not been able to be recognized. In contrast, in the present embodiment, the data processing section 108 recognizes the part handwritten in the normal region as the handwritten information in the group and conducts a process to contract and move, in the same manner as the handwritten information in the magnified region, whereby as FIG. 14e shows, the meaning of the handwritten information can be recognized without the handwritten information being divided.

Figure 15A:
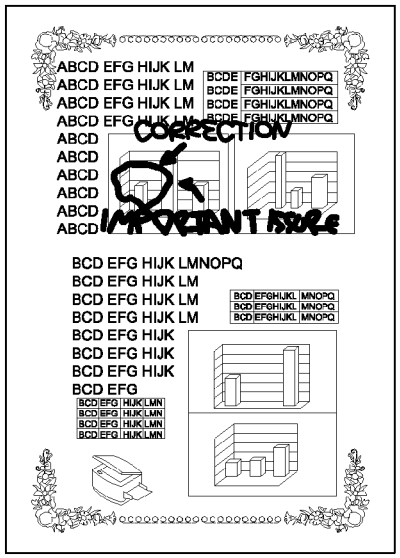
FIGS. 15a-15b are a diagram schematically showing another exemplary display of an information browsing apparatus related to a second embodiment of the present invention.
Figure 15B:
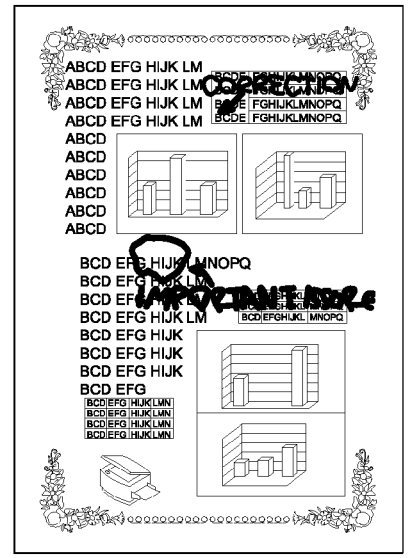
Figure 16A:
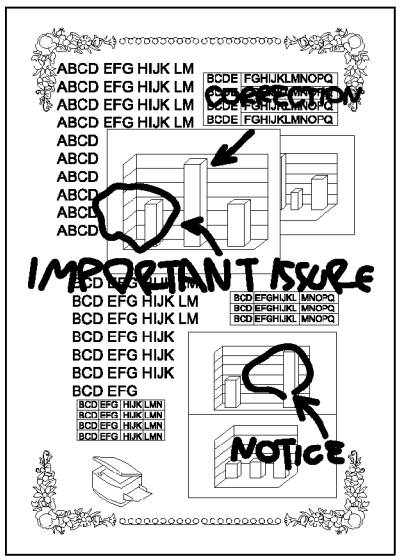
FIGS. 16a-16b are a diagram schematically showing still another exemplary display of an information browsing apparatus related to a second embodiment of the present invention.

Incidentally, the contraction ratio, the amount of moving and the layout are not limited in particular. For example, in case that it is desired to prevent displayed contents in the normal region from being hidden behind the handwritten information, as FIG. 15a shows, all of the handwritten information can be disposed in the region whose display magnification is changed back to the original. Also, in case the contracted handwritten information is disposed in the region whose display magnification has been changed back to the original, and as a result, the displayed contents in the region becomes difficult to be recognized, a part or whole handwritten information can be displayed in the normal region as FIG. 15b shows.

Figure 16B:
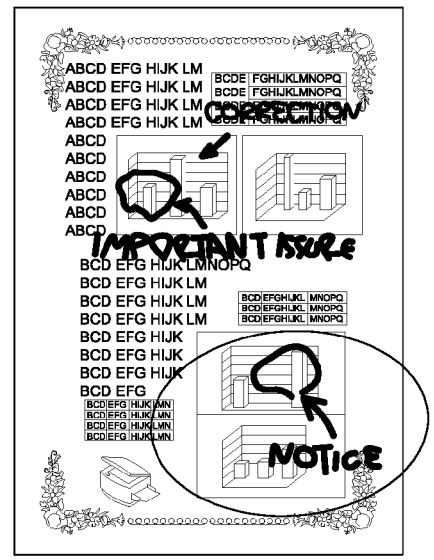

In the forgoing, while a case that the pieces of information handwritten in the predetermined time is recognized as the handwritten information in the group has been described, in case that after a handwritten input is performed in a way to straddle a plurality of regions, another handwritten input is subsequently performed in another region (refer to FIG. 16a), the information subsequently handwritten is judged to belong to the same region depending on setting of the predetermined time. In the above case, by provided a plurality of modes, such as a mode that the handwritten information is contracted/moved to be displayed and a normal mode that the handwritten information is displayed as it is, as FIG. 16b shows, the handwritten information (here word of "caution", a circle and a figure of an arrow) inputted in the normal mode can be displayed as it is even if the display form is changed. Whereby, the handwritten information cannot be contracted/moved against the user's intention.

Incidentally, the present invention is not limited to the aforesaid embodiments, and the configurations thereof can be appropriately modified without departing from spirit of the present invention.

For example, in the aforesaid embodiments, while the case that the handwriting information is inputted straddling two regions has been described, the control of the present invention can be applied to a case that the handwriting information is inputted straddling three regions in the same manner. Also, while the cases that the handwriting information is inputted in the display form to display the plurality of pages in the first embodiment and the handwriting information is inputted in the display form where the page is partially magnified in the second embodiment have been described, in a case that the handwriting information is inputted in a display form that the plurality of pages are displayed and a part thereof is magnified, the control of the present invention can be applied in the same manner.

The present invention can be applied to an apparatus provided with a display section having a touch panel and a program operated in said apparatus.

As the foregoing, according to the information browsing apparatus and the display control program of the present embodiment, the handwritten information straddling the plurality of the regions can be appropriately displayed so as to be recognized, even if the display form is changed.

What is claimed is:

1. A browsing apparatus enabling a first display format and a second display format, comprising:
    a display section to display a document and handwritten information which shows a locus of an object on the display section;
    a touch panel disposed on a display surface of the display section configured to detect contact with the object, and
    a data processing section, wherein:
        in a first display format, a first portion of the document is displayed on the display section as a single region, and
        in a second display format, the display section is divided into a plurality of regions displaying the first portion of the document and a second portion of the document, wherein the first portion of the document is displayed in a first region and the second portion of the document is displayed in a second region, the first and second regions are displayed simultaneously adjacent to one another, and the data processing section is configured to receive the handwritten information input straddling the first and second regions,
        the data processing section is configured to judge to which one of the first and second regions the handwritten information input in the second display format belongs to by determining in which of the first and second regions the handwritten information is first inputted, and
        in the first display format, the data processing section displays all of the handwritten information input in the second display format in the single region, and
        in the second display format, the data processing section displays all of the handwritten information straddling the first and second regions.

2. The information browsing apparatus of claim 1, wherein in the first display format, the document is displayed with a first magnification on the display section and in the second display format the display section is divided into the plurality of regions and a predetermined region is magnified by a second magnification greater than the first magnification to be displayed, and when the handwritten information is inputted straddling the predetermined region and another region than the predetermined region in the second display format, the data processing section judges to which region the handwritten information belongs and when displaying the document in the first display format, the data processing section displays all of the handwritten information in the region which the handwritten information is judged to belong thereto.

3. The information browsing apparatus of claim 1, wherein the data processing section moves, or contracts and moves, the handwritten information to the region which the handwritten information is judged to belong thereto.

4. The information browsing apparatus of claim 1, wherein the inputted handwritten information is first handwritten information, and when subsequent handwritten information is inputted in one of the separate regions other than the one of the separate regions within a predetermined time after the first handwritten information is judged to belong to the one separate region, the data processing section judges that the subsequent handwritten information belongs to the one separate region.

5. The information browsing apparatus of claim 1, wherein the inputted handwritten information is first handwritten information, and when subsequent handwritten information is inputted in one of the separate regions other than the one of the separate regions after a predetermined time since the first handwritten information is judged to belong to the one separate region, the data processing section judges that the subsequent handwritten information belongs to the another of the separate regions.

6. A nontransitory recording medium for a computer to read, storing a computer program to operate a browsing apparatus enabling a first display format and a second display format, which comprises:
    a display section to display a document and handwritten information which shows a locus of an object on the display section;
    a touch panel disposed on a display surface of the display section configured to detect contact with the object, and
    a data processing section,
    wherein in the first display format a first position of the document is displayed on the display section as a single region and in the second display format the display section is divided into a plurality of separate regions displaying the first portion of the document and a second portion of the document, wherein the first portion of the document is displayed in a first region and the second portion of the document is displayed in a second region, and the first and second regions are displayed simultaneously adjacent to one another in separate regions, and the data processing section is configured to receive the handwritten information input straddling the first and second regions,
    the data processing section judges to which one of the first or second regions the handwritten information input in the second display format belongs to by determining in which of the first and second regions the handwritten information is first inputted, and
    in the first display format, the data processing section displays all of the handwritten information input in the second display format in the single region, and in the second display format, the data processing section displays all of the handwritten information straddling the first and second regions.

7. The nontransitory recording medium for a computer to read, storing the computer program to operate the browsing apparatus of claim 6, wherein in the first display format, the document is displayed with a first magnification on the display section and in the second display format the display section is divided into the plurality of the regions and a predetermined region is magnified by a second magnification greater than the first magnification to be displayed, and when the handwritten information is inputted straddling the predetermined region and another region than the predetermined region in the second display format, the data processing section judges to which region the handwritten information belongs and when displaying the document in the first display format, the data processing section displays all of the handwritten information in the region which the handwritten information is judged to belong thereto.

8. The nontransitory recording medium for a computer to read, storing a computer program to operate the browsing apparatus of claim 6, wherein the data processing section moves, or contracts and moves, the handwritten information to the region which the handwritten information is judged to belong thereto.

9. The nontransitory recording medium for a computer to read, storing the computer program to operate the browsing apparatus of claim 6, wherein the inputted handwritten information is first handwritten information, and when subsequent handwritten information is inputted in one of the separate regions other than the one of the separate regions within a predetermined time after the first handwritten information is judged to belong to the one separate region, the data processing section judges that the subsequent handwritten information belongs to the one separate region.

10. The nontransitory recording medium for a computer to read, storing the computer program to operate the browsing apparatus of claim 6, wherein the inputted handwritten information is first handwritten information, and when subsequent handwritten information is inputted in one of the separate regions other than the one of the separate regions after a predetermined time since the first handwritten information is judged to belong to the one separate region, the data processing section judges that the subsequent handwritten information belongs to the another of the separate regions.

11. An information browsing apparatus enabling a first display format and a second display format, comprising:
a display section to display a document and handwritten information which shows a locus of an object on the display section;
a touch panel disposed on a display surface of the display section so as to detect contact with the object, and
a data processing section,
wherein in the first display format, the document is displayed with a first magnification on the display section and in the second display format the display section is divided into a plurality of regions and a predetermined region is magnified by a second magnification greater than the first magnification to be displayed, and when the handwritten information is inputted straddling the predetermined region and another region other than the predetermined region and which is at the first magnification in the second display format, the data processing section judges to which region the handwritten information belongs, then when displaying the document in the first display format, if the handwritten information is judged to belong to the predetermined region, the data processing section contracts and displays all of the handwritten information in accordance with a change of magnification of the predetermined region.

12. A nontransitory recording medium for a computer to read,
storing a computer program to operate a browsing apparatus including a display section to display a document and handwritten information which shows a locus of an object on the display section,
a touch panel disposed on a display surface of the display section configured to detect contact with the object and
a data processing section,
wherein in a first display format the document is displayed with a first magnification on the display section and in a second display format the display section is divided into a plurality of regions to display a predetermined region with a second magnification which is greater than the first magnification;
wherein the information browsing apparatus judges to which region the handwritten information belongs when the handwritten information is inputted straddling the predetermined region and another region other than the predetermined region and which is at the first magnification in the second display format, and contracts all of the handwritten information in accordance with a change of magnification of the predetermined region to display all of the handwritten information when the document is displayed in the first display format.

* * * * *